(12) United States Patent
Baur et al.

(10) Patent No.: US 9,624,959 B2
(45) Date of Patent: Apr. 18, 2017

(54) CONNECTING MEANS

(71) Applicants: Franz Baur, Oberstaufen (DE); Franz Haser, Oberstaufen (DE); Lamello AG, Bubendorf (CH)

(72) Inventors: Franz Baur, Oberstaufen (DE); Franz Haser, Oberstaufen (DE); Patrick Jeker, Brislach (CH); Philipp Seiler, Arboldswil (CH)

(73) Assignees: Franz Baur, Oberstaufen (DE); Franz Haser, Oberstaufen (DE); Lamello AG, Bubendorf (CH)

( * ) Notice: Subject to any disclaimer, the term of this patent is extended or adjusted under 35 U.S.C. 154(b) by 0 days.

(21) Appl. No.: 14/825,438

(22) Filed: Aug. 13, 2015

(65) Prior Publication Data

US 2015/0345532 A1 Dec. 3, 2015

Related U.S. Application Data

(63) Continuation of application No. PCT/EP2014/052832, filed on Feb. 13, 2014.

(30) Foreign Application Priority Data

Feb. 27, 2013 (DE) .................. 10 2013 203 289

(51) Int. Cl.
*F16B 21/08* (2006.01)
*F16B 17/00* (2006.01)
*F16B 12/26* (2006.01)

(52) U.S. Cl.
CPC .............. *F16B 21/08* (2013.01); *F16B 12/26* (2013.01); *F16B 17/00* (2013.01); *A47B 2230/0062* (2013.01); *Y10T 403/60* (2015.01)

(58) Field of Classification Search
CPC .......... F16B 21/08; F16B 17/00; F16B 12/26; Y10T 403/60; A47B 2230/0062
See application file for complete search history.

(56) References Cited

U.S. PATENT DOCUMENTS

| 4,641,988 A | 2/1987 | Ganner |
| 4,826,222 A | 5/1989 | Davis |

(Continued)

FOREIGN PATENT DOCUMENTS

| DE | 26 42 488 | 12/1977 |
| DE | 10 2011 102 051 | 11/2012 |

*Primary Examiner* — Victor MacArthur
(74) *Attorney, Agent, or Firm* — Womble Carlyle Sandridge & Rice LLP

(57) ABSTRACT

In order to provide a connecting means for connecting a first component and a second component, in particular for connecting furniture parts or machine parts, by means of which the components may be connected to one another simply and reliably, it is proposed that the connecting means includes a first connecting element which in the connected condition of the components is arranged on the first component, and a second connecting element which in the connected condition of the components is arranged on the second component, wherein, for connecting the first component and the second component, a spring element of the first connecting element is configured to come into engagement with a receiving element of the second connecting element, wherein the connecting means, in particular the first connecting element and/or the second connecting element, includes a reinforcing element for reinforcing a spring force of the spring element.

18 Claims, 9 Drawing Sheets

(56) References Cited

U.S. PATENT DOCUMENTS

| | | | |
|---|---|---|---|
| 5,517,730 A | 5/1996 | Ho | |
| 5,529,428 A | 6/1996 | Bischof | |
| 5,730,544 A | 3/1998 | Dils et al. | |
| D422,893 S | 4/2000 | Heredos-Formby | |
| 6,641,496 B2 * | 11/2003 | Tada | F16H 7/0829 474/101 |
| D484,030 S | 12/2003 | Thach | |
| 6,811,029 B2 * | 11/2004 | Eggum | H01L 21/67383 206/454 |
| D525,111 S | 7/2006 | Farrell et al. | |
| D528,400 S | 9/2006 | Vetter | |
| D531,887 S | 11/2006 | Rimer, Jr. | |
| D539,129 S | 3/2007 | Griffiths | |
| 7,294,027 B1 * | 11/2007 | Tyler | H01R 13/187 439/845 |
| D560,484 S | 1/2008 | Smith | |
| D640,537 S | 6/2011 | Parks et al. | |
| 8,092,114 B2 * | 1/2012 | Baur | E05B 63/123 292/241 |
| 8,240,942 B2 * | 8/2012 | Baur | B23C 5/08 403/292 |
| D686,903 S | 7/2013 | Guichot | |
| 2002/0119848 A1 * | 8/2002 | Tada | F16H 7/0829 474/111 |
| 2003/0106830 A1 * | 6/2003 | Eggum | H01L 21/67383 206/711 |
| 2005/0062377 A1 * | 3/2005 | Hightower | A47B 96/00 312/265.5 |
| 2005/0076484 A1 * | 4/2005 | Sussenbach | F16B 21/186 24/662 |
| 2005/0086773 A1 * | 4/2005 | Kuhnle | B60R 13/0206 24/297 |
| 2010/0111598 A1 * | 5/2010 | Baur | E05B 63/123 403/348 |
| 2010/0111599 A1 * | 5/2010 | Baur | B23C 5/08 403/350 |
| 2012/0328386 A1 * | 12/2012 | Baur | B23C 5/08 409/179 |

\* cited by examiner

CONNECTING MEANS

CROSS-REFERENCE TO RELATED APPLICATIONS

The present application is a continuation of international application number PCT/EP2014/052832, filed on Feb. 13, 2014, which claims priority to German patent application number 10 2013 203 289.7, filed on Feb. 27, 2013, the entire specification of both being incorporated herein by reference.

FIELD OF DISCLOSURE

The present invention relates to a connecting means for connecting a first component and a second component, in particular for connecting furniture parts or machine parts.

BACKGROUND

A connecting means of this kind is known for example from EP 1 990 549 A1.

SUMMARY OF THE INVENTION

The object of the present invention is to provide a connecting means for connecting a first component and a second component, by means of which the components may be connected to one another simply and reliably.

According to the invention, this object is achieved by a connecting means for connecting a first component and a second component, in particular for connecting furniture parts or machine parts, which includes the following:
- a first connecting element which in the connected condition of the components is arranged on the first component and includes a spring element, and
- a second connecting element which in the connected condition of the components is arranged on the second component and includes a receiving element, wherein, for connecting the first component and the second component, the spring element is configured to come into engagement with the receiving element, and wherein the connecting means, in particular the first connecting element and/or the second connecting element, includes a reinforcing element for reinforcing a spring force of the spring element.

Because there is provided in the connecting means according to the invention a spring element which is configured to come into engagement with a receiving element, by means of the connecting means the two components may be connected, and in particular may be latched, to one another simply.

Because according to the invention the connecting means, in particular the first connecting element and/or the second connecting element, includes one or more reinforcing elements for reinforcing a spring force of the spring element, the components may be held together in the connected condition by a large holding force.

The reinforcing element or elements will be described below, in particular in connection with the first connecting element. However, as an alternative or in addition to this, it may also be provided for the second connecting element to include a reinforcing element or a plurality of reinforcing elements which then have preferably individual or a plurality of the features and/or advantages described in the context of the reinforcing elements of the first connecting element.

In this description and the appended claims, the term spring element is in particular to be understood as a resilient element which is arranged with one end for example on a base body such that the other end is movable in relation to the base body. A spring action, in particular a spring force, of the spring element preferably results from flexing the spring element.

Preferably, the connecting means, in particular the first connecting element, includes a plurality of spring elements and/or a plurality of reinforcing elements.

Further, it may be provided for the connecting means, in particular the second connecting element, to include a plurality of receiving elements.

In an embodiment of the invention, it is provided for the connecting means, in particular the first connecting element and/or the second connecting element, to include at least one reinforcing element which takes the form of an auxiliary spring element and which acts preferably directly on the spring element for reinforcing the spring force of the spring element.

In this description and the appended claims, the term auxiliary spring element is in particular to be understood as a spring element which acts on the receiving element only indirectly, namely by means of the spring element which is configured to come into engagement with the receiving element.

The spring element which is configured to come directly into engagement with the receiving element is preferably a main spring element.

It may be favorable if, in a disconnected condition of the connecting elements, the at least one auxiliary spring element is arranged spaced from the spring element, in particular the main spring element.

It may be advantageous if the at least one auxiliary spring element has at least approximately a shape corresponding to the spring element, in particular the main spring element.

In particular, it may be provided for the external shape of the at least one auxiliary spring element to correspond at least approximately to the external shape of the spring element, in particular the main spring element, but for the at least one auxiliary spring element to have smaller dimensions than the spring element, in particular the main spring element.

In an embodiment of the invention, it may be provided for the at least one auxiliary spring element to include an abutment portion by means of which the auxiliary spring element is configured to abut against the spring element, for reinforcing the spring force of the spring element.

The abutment portion is arranged in particular at an end of the auxiliary spring element which is opposite the end on which the auxiliary spring element is arranged, for example on a base body of the connecting element.

It may be advantageous if the at least one auxiliary spring element is formed in one piece with the spring element and/or in one piece with a base body of the first connecting element.

It may for example be provided for the first connecting element, which preferably includes at least one spring element, in particular a main spring element, and/or at least one auxiliary spring element, to take the form at least in certain regions of an injection-molded plastics part.

In particular, it may be provided for the first connecting element to include a one-piece injection-molded part which includes at least one spring element, at least one reinforcing element, for example at least one auxiliary spring element, and/or the base body of the first connecting element.

In one embodiment of the invention, it is provided for the first connecting element to include at least two reinforcing elements that take the form of auxiliary spring elements. Preferably, for reinforcing the spring force of the spring element, at least one auxiliary spring element acts directly on the spring element, in particular the main spring element. For reinforcing the spring force of the spring element, in particular the main spring element, at least one further auxiliary spring element acts preferably directly on the at least one auxiliary spring element which acts directly on the spring element, in particular the main spring element.

In a further embodiment of the invention, it may be provided for the first connecting element to include at least one reinforcing element that takes the form of a stiffening element and which is preferably connected to the spring element such that a deformation of the spring element results in a deformation of the stiffening element.

In particular, it may be provided for the first connecting element to include at least one reinforcing element that takes the form of a stiffening element and which is connected to the spring element such that a deformation of the spring element results in a compression and/or a shearing of the stiffening element.

Thus, the stiffening element preferably acts on the spring element for reinforcing the spring force of the spring element.

It may be favorable if the stiffening element extends in part or entirely along the spring element and is connected to the spring element over this part of the spring element or over the entire spring element.

In particular, it may be provided for a deflection or a flexing of the spring element to result in a compression and/or a shearing of the stiffening element, as a result of which the spring force of the spring element is preferably reinforced.

In this description and the appended claims, the expression a compression and/or shearing is preferably to be understood as a compressive load and/or shear load over a large surface area. Preferably, a compression and/or a shearing of the stiffening element is not merely a flexing of the stiffening element.

It may be favorable if the first connecting element includes at least one reinforcing element which takes the form of a stiffening element and which is connected to at least one auxiliary spring element, in particular such that deformation of the auxiliary spring element results in a compression and/or a shearing of the stiffening element.

The at least one stiffening element is preferably made from a material which is a material different from the material of the spring element and/or which is a material different from the material of a base body of the first connecting element.

Further, it may be provided for the at least one stiffening element to be made from a material which is a material different from the material of the at least one auxiliary spring element.

The at least one stiffening element is preferably made from an injection-moldable elastomer material and/or a thermoplastic material, or includes an injection-moldable elastomer material and/or a thermoplastic material.

It may be favorable if the first connecting element includes at least one reinforcing element that takes the form of an auxiliary spring element and at least one reinforcing element that takes the form of a stiffening element.

Preferably, in this case, an intermediate space between the auxiliary spring element and the spring element is filled, in part or entirely, by the stiffening element.

Thus, preferably a connection over a large surface area between the spring element, in particular the main spring element, and the auxiliary spring element is made by the stiffening element.

In particular, the stiffening element may in this case contribute to reinforcing the spring force of the spring element, by a shearing of the stiffening element that results from flexing the spring element and the auxiliary spring element.

It may be favorable if the receiving element includes a receiving projection and/or a receiving recess.

In the connected condition, preferably an engaging portion of the spring element engages behind the receiving element in the region of the receiving projection and/or the receiving depression.

In an embodiment of the invention, it may be provided for the receiving element to include a clamping portion along which an engaging portion of the spring element is movable for making the connection between the first component and the second component, wherein the spring element is thereby tensioned.

Movement of the components, in particular the connecting elements, in relation to one another is in this case preferably performed along a connecting direction. The connecting direction is substantially perpendicular to a connecting plane in which the components and/or the connecting elements abut against one another in the connected condition.

It may be advantageous if the clamping portion of the receiving element—as seen in a direction of insertion that extends parallel to the connecting direction—includes an initially steeper portion and, adjoining this, a flatter portion, for example a substantially parabolic cross section. In this case, the cross section is in particular in a plane which is defined by a direction of deflection of the engaging portion of the spring element and the connecting direction between the two components.

The parabolic shape of the cross section is produced in particular if the connecting direction is a y axis and the associated x axis extends in the connecting plane, in particular substantially parallel to the deflecting direction of the engaging portion.

Preferably, by means of the clamping portion of the receiving element, when the connecting elements are connected to one another the spring element may develop a force such that the spring element is at first deflected relatively quickly and then more slowly. As a result, it is possible for a maximum force for pushing together (connecting) the connecting elements to be as small as possible and yet to achieve a powerful holding force for holding the connecting elements together.

It may be advantageous if the receiving element is constructed to be resilient, at least in certain regions.

In particular, it may be provided for the receiving element to be constructed to be yielding, at least in certain regions, in and/or opposite to a deflecting direction of the engaging portion of the spring element.

Preferably, the receiving element is connected, at an end of the receiving element that faces the first connecting element, to a base body of the second connecting element.

Preferably, at least one end of the receiving element that is remote from the first connecting element is constructed to be movable.

In one embodiment of the invention, it is provided for the first connecting element to include at least two spring elements which in the connected condition embrace the receiving element on both sides.

Preferably, at least one reinforcing element, in particular at least one auxiliary spring element and/or at least one stiffening element, is associated with each spring element, in particular each main spring element.

It may be provided for the receiving element to be constructed to be symmetrical in relation to a transverse center plane of the receiving element that extends perpendicular to a connecting plane of the connecting means.

In particular if the first connecting element includes at least two spring elements which in the connected condition embrace the receiving element on both sides, it may be provided for the at least two spring elements which in the connected condition embrace the receiving element to be tensionable in uniform manner, in particular for the engaging portions of the spring elements to be movable apart in uniform manner.

It may be advantageous for the first connecting element to include at least two spring elements and at least two reinforcing elements, wherein, in relation to a transverse center plane of the first connecting element that extends perpendicular to a connecting plane of the connecting means, the at least two spring elements and the at least two reinforcing elements are arranged symmetrically to one another on the first connecting element and/or are constructed to be symmetrical to one another. By this means, too, a uniform tensioning of the spring elements can be effected for reliable connection of the connecting elements to one another.

The at least two spring elements and the at least two reinforcing elements are in particular arranged on the base body, in particular being constructed in one piece with the base body or being connected to the base body with a substance-to-substance bond.

It may be favorable if at least one connecting element includes a base body which is substantially in the shape of a circular-cylindrical segment or a circular-cylindrical portion, and at least one holding projection which is substantially in the shape of a circular arc and by means of which the at least one connecting element is securable in the component.

Further, the connecting means according to the invention may have individual or a plurality of the features and/or advantages described below.

Preferably, at least one of the connecting elements includes a curved abutment face which is in the shape of a circular arc in longitudinal section.

It may be favorable if, in the connected condition of the components, the first connecting element and the second connecting element are detachably connected to one another.

Preferably, the connecting elements are configured to be moved from the disconnected condition into the connected condition and/or from the connected condition into the disconnected condition by reversible deformation of the at least one spring element and by reversible deformation of the at least one reinforcing element.

In particular if at least one of the connecting elements includes a curved abutment face which is in the shape of a circular arc in longitudinal section, this abutment face may slide on a groove base face, similarly in the shape of a circular arc in longitudinal section, of a groove provided in one of the components, as a result of which the orientation of the relevant connecting element in relation to the respectively other connecting element may be altered within certain limits as the connecting elements connect, in order to compensate for positional tolerances of the grooves in which the connecting elements are arranged, and/or for manufacturing tolerances of the connecting elements.

This additional degree of freedom of movement means that, when the two components are assembled, corrections in their mutual positions are still possible, which significantly reduces the demands on precision in the position of the grooves in the components and results in considerable simplification for the user.

The connecting elements of the connecting means according to the invention are preferably inserted into grooves that are already present in the components, with the result that there is no need for a strong force to be exerted in order to insert the connecting elements in the components and so there is no risk of damage to these components.

In a preferred embodiment of the invention, a substantially planar bearing face of the first connecting element is configured to bear against a similarly substantially planar bearing face of the second connecting element.

In the connected condition of the components, the substantially planar bearing face of the first connecting element and/or the second connecting element is preferably aligned substantially parallel to contact faces of the components at which the components abut against one another.

Further, in the connected condition of the components, the curved bearing face and the substantially planar bearing face of the first connecting element and/or the second connecting element are oriented substantially perpendicular to the connecting direction.

A curved bearing face of at least one connecting element may in particular be constructed to be substantially in the shape of a portion of a circular-cylindrical surface.

In particular so that shear forces may also be dispersed by means of the connection between the connecting elements, it may be advantageous if at least one of the connecting elements includes at least one push-in projection and the respectively other connecting element includes at least one receiving pocket which, in the connected condition of the components, receives the push-in projection. As a result, additional dowels such as those required with most other connecting means can be dispensed with.

If at least one receiving pocket is longer in extent in a longitudinal direction of the connecting means than the push-in projection received therein, this has the advantage that the first connecting element and the second connecting element can be displaced in relation to one another in the longitudinal direction, in order in this way to enable a tolerance compensation of the connection between the components.

In order to obtain a particularly effective anchoring of at least one of the connecting elements in the associated component, it may be provided for at least one of the connecting elements to be provided with at least one holding projection, which has a curved support face that is in the shape of a circular arc in longitudinal section.

With this curved support face, the holding projection can be supported against a similarly curved undercut face of an undercut portion of a groove in the associated component, wherein this undercut face is similarly in the shape of a circular arc in longitudinal section and has the same radius of curvature as the curved support face of the holding projection. Engagement between the holding projection and the undercut portion of the groove results in a positively-locking connection between the component and the connecting element.

The holding projection of the connecting means according to the invention is preferably not constructed to be self-cutting.

Rather, the holding projection is provided for pushing into a groove which is already made before the connecting element is inserted into the component and which has an undercut portion in the relevant component in the longitudinal direction of the groove. In this case, the holding projection can be displaced with little exertion of force in the tangential direction in the undercut portion of the groove, with the result that the connecting element still has a degree of freedom of movement in this direction and so when the components are connected corrections are still possible in relation to their mutual positions.

The holding projection may in particular have blunt ends and/or rounded lead-in chamfers in its end regions.

A holding projection which is not self-cutting may have a cross-sectional surface area of any desired size in order to increase the mechanical stability of the holding projection.

In particular, the cross-sectional surface area of the holding projection may be at least 1 mm$^2$.

The holding projection may have a substantially rectangular or substantially trapezoidal cross section.

As an alternative or in addition to this, it may be provided for the at least one holding projection to taper as the spacing from a base body of the respective connecting element increases.

On the other hand, it may be provided for at least one holding projection to taper as the spacing from a base body of the respective connecting element decreases.

As an alternative or in addition to this, it is also conceivable for at least one holding projection to have a cross section with an external contour that is curved, at least in certain regions.

In a preferred embodiment of the invention it is provided for at least one holding projection to adjoin the curved abutment face of the respective connecting element substantially flush therewith. In this case, the holding projection is thus arranged on the outermost edge of the associated connecting element—the edge facing the base of the groove.

As an alternative or in addition to this, it may also be provided for at least one holding projection to be arranged offset from the curved abutment face of the respective connecting element. The holding projection may thus in particular have a smaller radius of curvature than the curved abutment face of the respective connecting element.

Further, it may be provided for a plurality of holding projections having different radii of curvature to be arranged on the same connecting element. In particular, a plurality of holding projections having different radii of curvature may be arranged on the same side of the respective connecting element.

As an alternative or in addition to anchoring the connecting elements by means of one or more holding projections, it may also be provided for at least one of the connecting elements to be provided with at least one anchoring element for securing the relevant connecting element to a groove base of a groove provided in one of the components.

Further, it may be provided for at least one of the connecting elements to be provided with at least one anchoring screw for securing the relevant connecting element to one of the components.

It may be provided for a connecting element, in particular a base body and/or a spring element and/or a reinforcing element and/or a receiving element, to include a glass fiber-reinforced polyamide material or to be formed from a glass fiber-reinforced polyamide material.

The connecting elements are in particular configured to be latched to one another.

By using reinforcing elements that are constructed as stiffening elements, the spring force of the spring element may preferably be increased from for example approximately 150 N to for example approximately 600 N.

The engaging portion of the spring element preferably has a sloping face which is configured to come into contact with a sloping face of the receiving element such that in the connected condition the connecting elements are drawn towards one another by means of a connecting force.

Because of the sloping face of the engaging portion of the spring element and/or the sloping face of the receiving element, the connecting elements may preferably be detached from one another without irreversibly deforming the spring element or the receiving element.

The second connecting element, which includes the receiving element, is preferably configured to be arranged completely in a groove in the second component, with the result that in particular there is no element or part of the second connecting element protruding beyond a surface, in particular a main surface, of the second component.

In particular if the receiving element is constructed to be at least in part resilient or yielding, a spring travel of the spring element, required to ensure a desired holding force, may be shortened.

At least one spring element and/or at least one auxiliary spring element take the form for example of a leaf spring element.

Further preferred features and/or advantages of the invention form the subject of the description below and the representation of an exemplary embodiment in the drawings.

BRIEF DESCRIPTION OF THE DRAWINGS

In the drawings.

Like or functionally equivalent elements are provided with the same reference numerals in all the Figures.

DETAILED DESCRIPTION OF THE INVENTION

An embodiment, illustrated in FIGS. 1 to 13, of a connecting means that is designated 100 as a whole serves to connect a first, for example substantially plate-like, component 102 to a second component 104, similarly preferably substantially plate-like.

The two components 102 and 104 may be for example wood panels or plywood panels, but may also be made from any other materials as desired, for example a metal material or a plastics material, for example Plexiglas. Further, it may be provided for the first component 102 and the second component 104 to be formed from mutually different materials.

Figure 3:
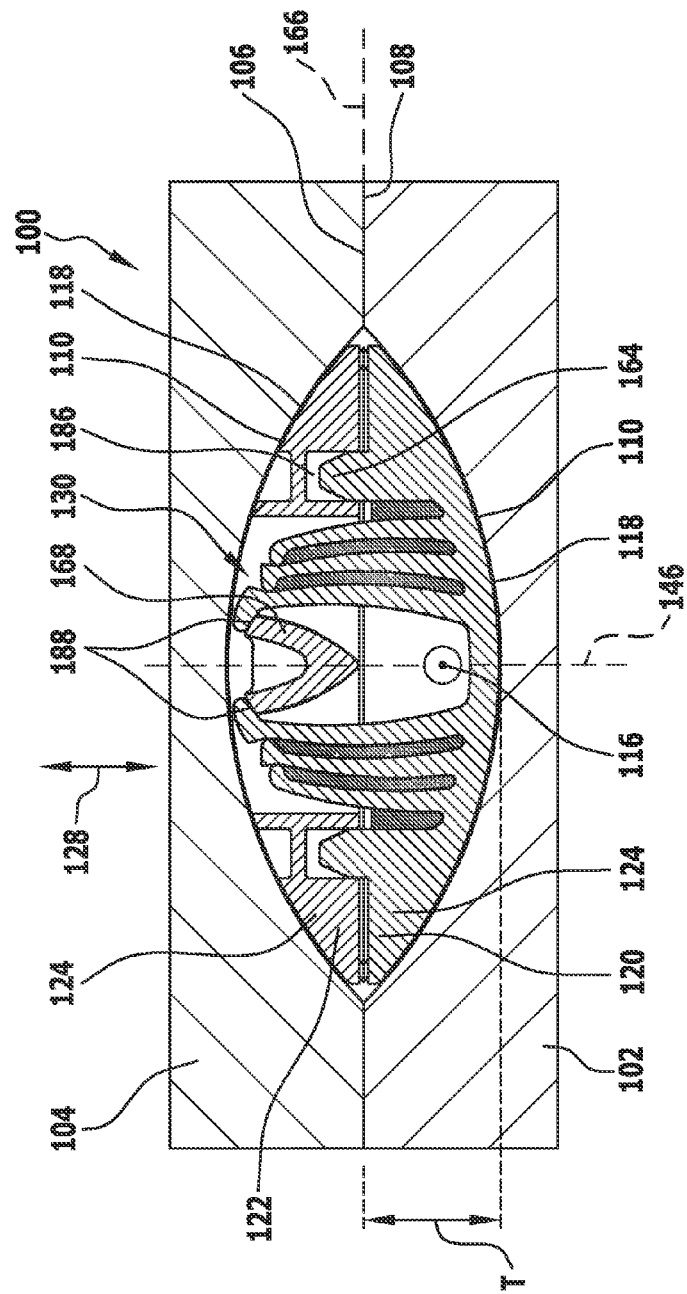
FIG. 3 shows a schematic sectional illustration, corresponding to FIG. 1, of the components and the connecting means, in a connected condition of the components and the connecting elements of the connecting means.

In the connected condition of the two components 102 and 104, illustrated in FIG. 3, a contact face 106 of the first component 102, arranged for example on a short side or end face of the first component 102, abuts against a contact face 108 of the second component 104, which is for example a main surface of the plate-like second component 104.

In both the first component 102 and the second component 104, at least one groove 110, which is open towards the respective contact face 106, 108, is provided in each case.

The groove 110 includes a base portion 112 which is in the form of a circular-cylindrical segment or a circular-cylindrical portion, and two undercut portions 114 which extend away from the base portion 112 in a through-thickness direction 116.

The radius of curvature of the base portion 112 is larger than a groove depth T (see FIG. 1), with the result that a curved groove base face 118 forms an acute angle with the respective contact face 106, 108.

In particular as regards the further shaping of the groove 110 and the creation of a groove 110 of this kind, explicit reference is made here to EP 1 990 549 A1, which is incorporated in this description by such reference.

For connecting the components 102, 104 to one another, the connecting means 100 includes a first connecting element 120 and a second connecting element 122.

As can be seen in particular from FIGS. 4 to 7, each of the connecting elements 120, 122 includes a base body 124 which is constructed to be substantially in the form of a circular-cylindrical segment or circular-cylindrical portion.

The base body 124 is constructed to be in particular at least in certain regions and at least approximately complementary to the base portion 112 of the groove 110.

Each of the connecting elements 120, 122 further includes two holding projections 126 which extend away from the portion of the base body 124 that is constructed to be complementary to the base portion 112 in the through-thickness direction 116.

The holding portions 126 are curved in an arc shape and are constructed to be at least approximately substantially complementary to the undercut portions 114 of the groove 110.

By means of the holding projections 126, the connecting elements 120, 122 may thus be secured, at least in respect of a connecting direction 128, with positive engagement with the components 102, 104, in particular in the grooves 110 in the components 102, 104.

For this purpose, the connecting elements 120, 122 are configured to be pushed along the undercut portions 114 and into the grooves 110 in the components 102, 104 (see in particular FIGS. 8 to 13).

Figure 4:
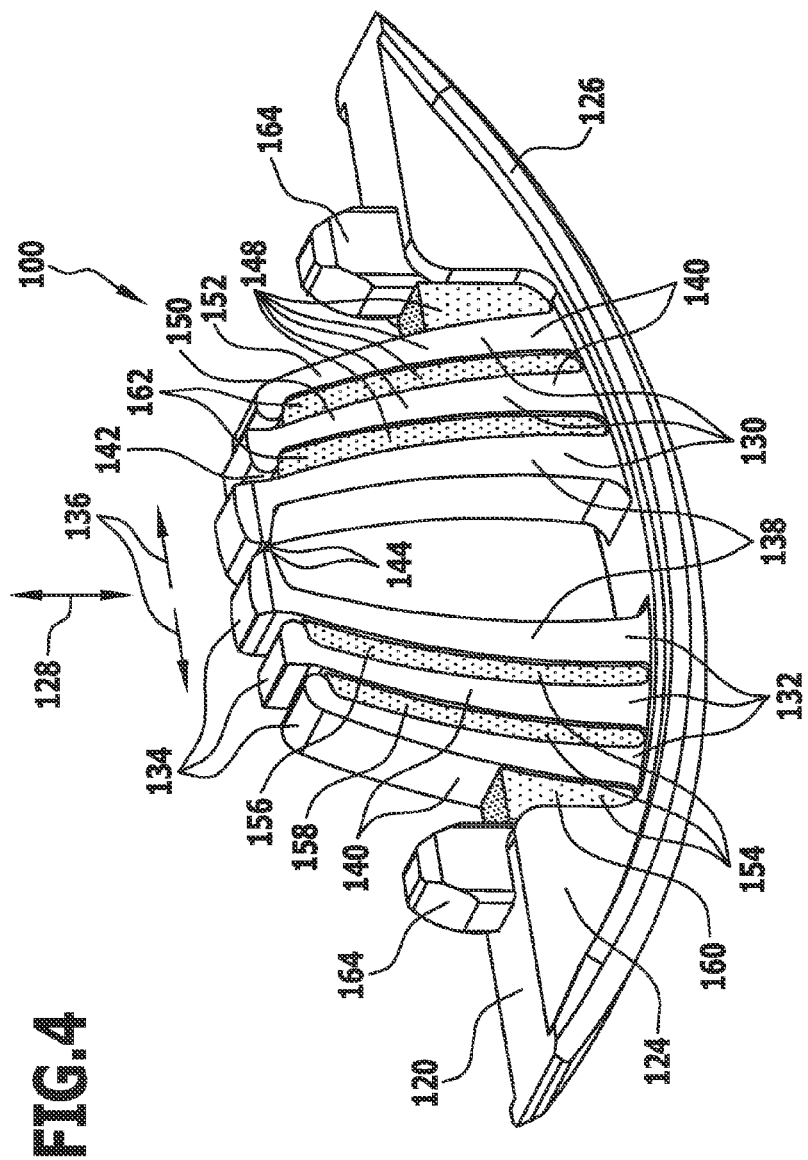
FIG. 4 shows a schematic perspective illustration of a first connecting element of the connecting means.
Figure 5:
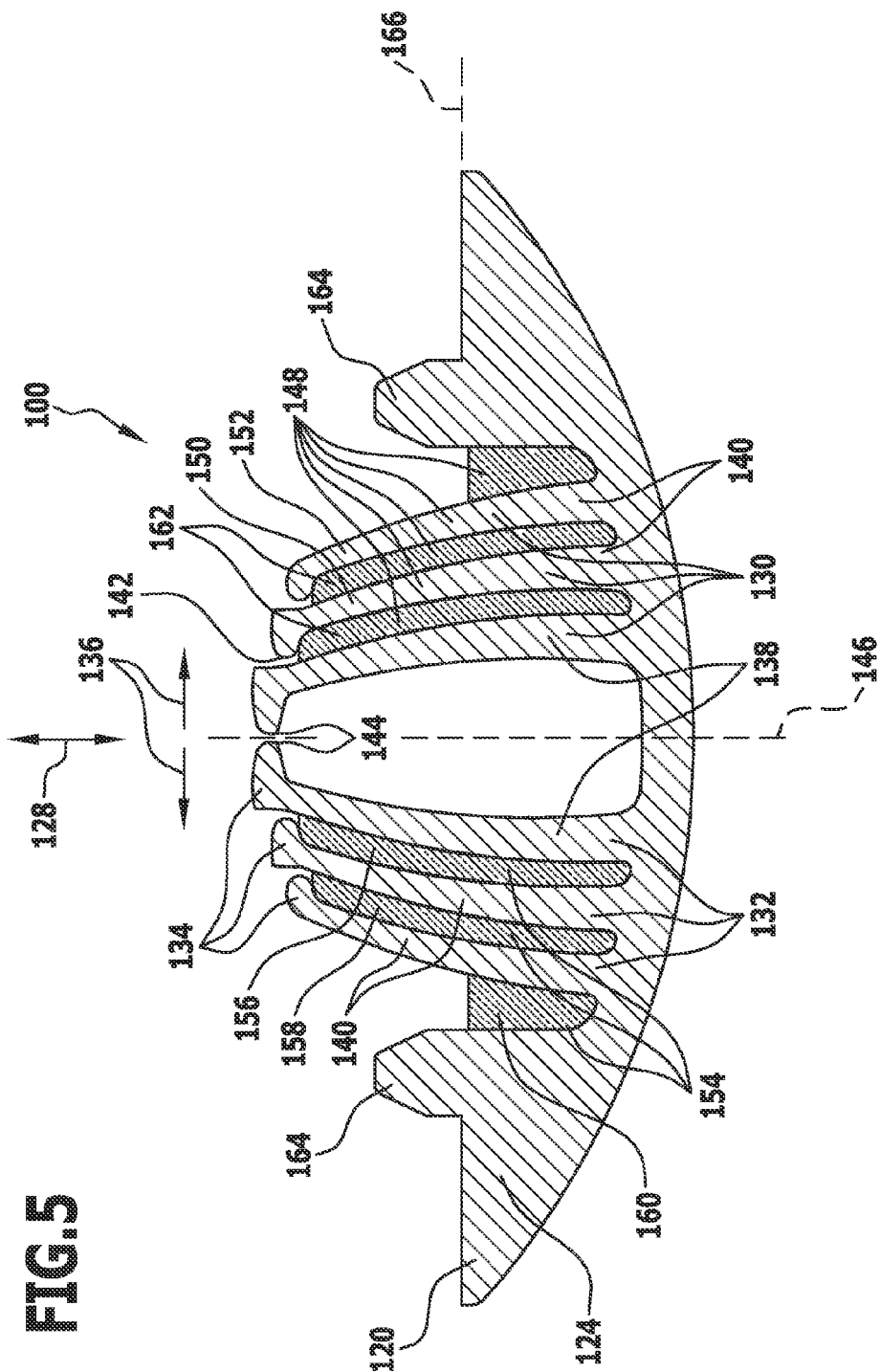
FIG. 5 shows a schematic longitudinal section through the first connecting element from FIG. 4.

As can be seen in particular from FIGS. 4 and 5, the first connecting element 120 includes the base body 124, the holding projections 126 and a plurality of spring elements 130.

The spring elements 130 are for example leaf springs.

Each spring element 130 has an end 132 facing the base body 124 and an end 134 remote from the base body 124.

By means of the end 132 of each spring element 130 facing the base body 124, the spring element 130 is arranged on the base body 124 and is in particular connected in one piece with the base body 124.

The end 134 of each spring element 130 remote from the base body 124 is configured to move in a deflecting direction 136 that is aligned transversely, in particular substantially perpendicular, to the connecting direction 128.

For this purpose, the spring elements 130 are constructed to be flexible.

In the embodiment of the first connecting element 120 illustrated in the Figures, two spring elements 130 are provided, which for connecting the connecting elements 120, 122 come into direct contact with a receiving element (to be described below) of the second connecting element 122. These spring elements 130 are thus main spring elements 138.

The further spring elements 130 are auxiliary spring elements 140, which for connecting the connecting elements 120, 122 cooperate with the receiving element of the second connecting element 122 only indirectly, namely by means of the main spring elements 138.

The auxiliary spring elements 140 are arranged adjacent to the main spring elements 138 and have abutment portions 142 on the end 134 of the auxiliary spring elements 140 remote from the base body 124, by means of which the auxiliary spring elements 140 are configured to bear against the main spring elements 138 in order to be able to act on the main spring elements 138.

The main spring elements 138 include a respective engaging portion 144 on the end 134 of the main spring elements 138 remote from the base body 124, and by means of these engaging portions 144 the main spring elements 138 are configured to come into engagement with the receiving element of the second connecting element 122, for connecting the connecting elements 120, 122.

In particular, the engaging portions 144 of the main spring elements 138 are configured to deflect in the deflecting direction 136, in order to come into engagement with the receiving element of the second connecting element 122.

The auxiliary spring elements 140 are arranged on the sides of the main spring elements 138 remote from the engaging portions 144.

In the embodiment of the first connecting element 120, illustrated in the Figures, a total of six spring elements 130 are provided, in particular two main spring elements 138 and four auxiliary spring elements 140.

The spring elements 130 are in this case arranged such that a main spring element 138 and two auxiliary spring elements 140, which are associated with this main spring element 138, on the one hand and a main spring element 138 and two auxiliary spring elements 140, associated with this main spring element 138, on the other hand oppose one another in a mirror-symmetrical arrangement in relation to a transverse center plane 146 of the first connecting element 120 that extends parallel to the connecting direction 128.

The engaging portions 144 of the main spring elements 138 may preferably be moved away from the transverse center plane 146 in mutually opposite deflecting directions 136. In this case, the effect is such that the ends 134 of the auxiliary spring elements 140 remote from the base body 124 are also deflected in the corresponding deflecting directions 136.

The force required for deflection is significantly increased by the additional deflection of the auxiliary spring elements 140, since the spring force which counteracts the deflection is at least approximately the sum of the spring force of the main spring element 138 and of the associated auxiliary spring elements 140.

The auxiliary spring elements 140 thus form reinforcing elements 148 for reinforcing a spring action or spring force of the main spring element 138.

As can be seen in particular from FIG. 5, it is provided in particular in this case for a first auxiliary spring element 150 to act directly on the main spring element 138 when the main spring element 138 is deflected. A second auxiliary spring element 152 acts directly on the first auxiliary spring element 150 when the main spring element 138 and the first auxiliary spring element 150 are deflected.

Preferably, an intermediate space 154 is formed between the spring elements 130.

In the embodiment illustrated in the Figures, a first intermediate space 156 is provided between the main spring element 138 and the first auxiliary spring element 150, and a second intermediate space 158 is provided between the first auxiliary spring element 150 and the second auxiliary spring element 152.

A third intermediate space 160 may be formed for example between the second auxiliary spring element 152 and a portion of the base body 124, for example an insertion projection (to be described below) of the base body 124.

For further reinforcement of the spring action or spring force of the spring elements 130, in particular the main spring elements 138, the intermediate spaces 154, in particular the first intermediate space 156, the second intermediate space 158 and/or the third intermediate space 160, are preferably filled with a filler material, at least in certain regions.

The filler material may for example be an injection-moldable elastomer material and/or a thermoplastic material which is connected to the spring elements 130 and/or the base body 124, preferably over a large surface area, in particular being connected by a substance-to-substance bond.

Because this connection of the spring elements 130 to one another and/or to the base body 124 makes deflection of the spring elements 130 more difficult and thus contributes to stiffening the spring elements 130, each filled intermediate space 154 forms a stiffening element 162 for stiffening the spring elements 130, in particular the main spring element 138.

The stiffening elements 162 are thus also reinforcing elements 148 for reinforcing a spring action or spring force of the spring elements 130, in particular the main spring element 138.

Because the connection of the stiffening elements 162 to the spring elements 130 and/or to the base body 124 is over a large surface area, when the spring elements 130 are deflected the stiffening elements 162 are substantially under shear load.

The first connecting element 120 further includes at least one, preferably two, insertion projections 164 which are configured to come into engagement with receiving pockets (to be described below) of the second connecting element 122, in order to be able to position the connecting elements 120, 122 in relation to one another in controlled manner.

The spring elements 130 and stiffening elements 162 and the insertion projections 164 preferably protrude at least in part beyond a connecting plane 166 over which the components 102, 104 and/or the connecting elements 120, 122 abut against one another in the connected condition thereof.

Figure 6:
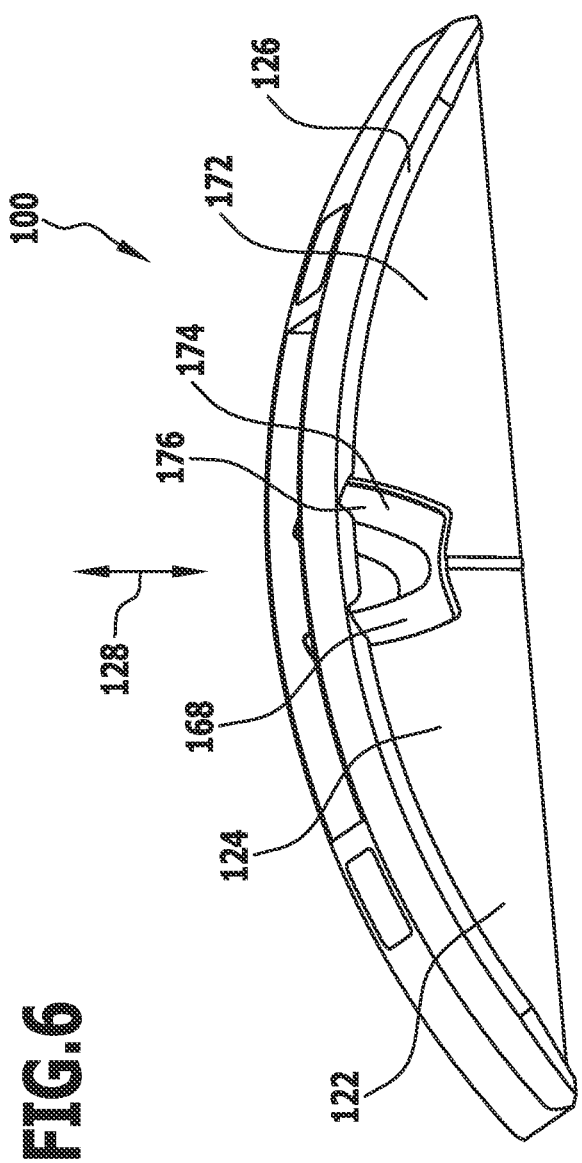
FIG. 6 shows a schematic perspective illustration, corresponding to FIG. 4, of a second connecting element of the connecting means.
Figure 7:
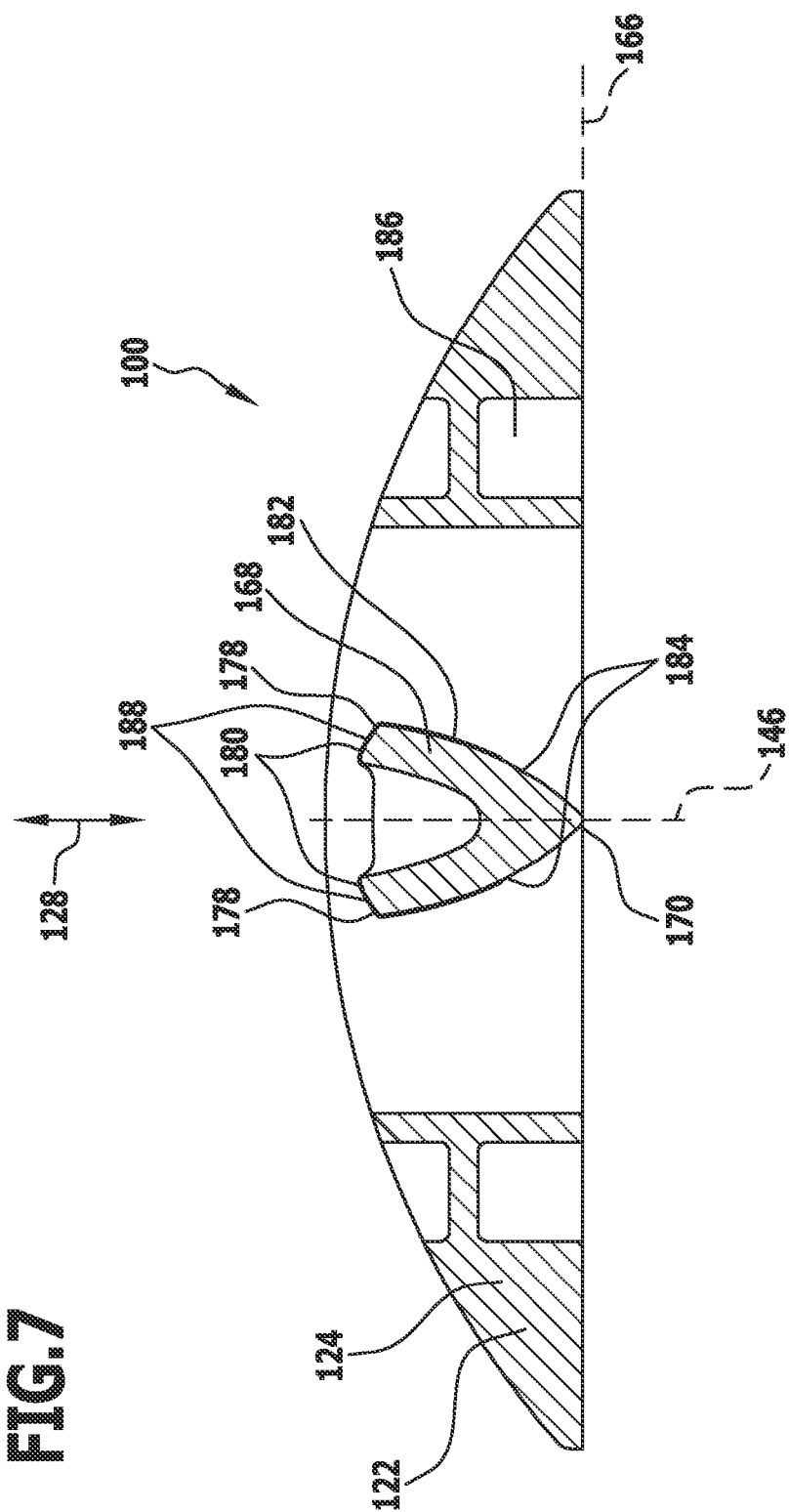
FIG. 7 shows a sectional illustration, corresponding to FIG. 5, through the second connecting element from FIG. 6.
Figure 8:
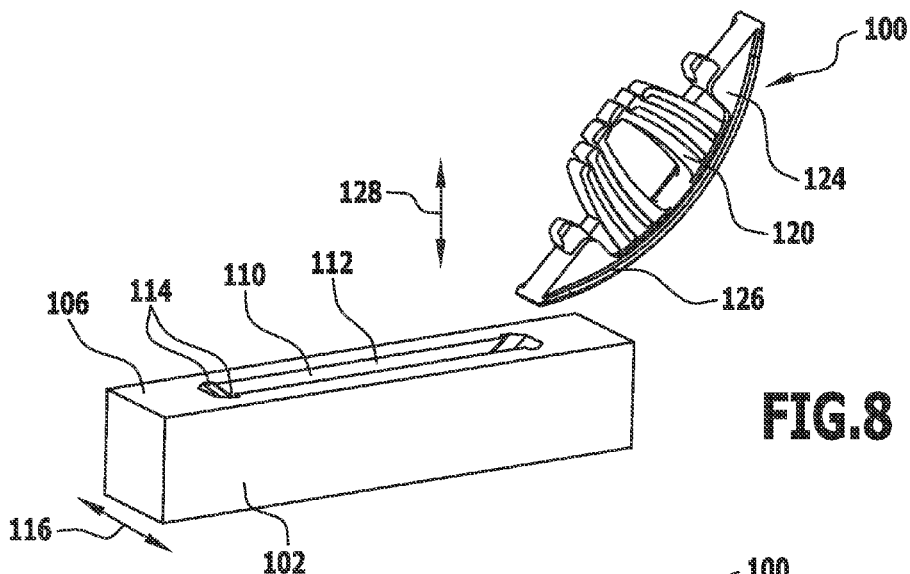
FIG. 8 shows a schematic perspective illustration of the first connecting element and the first component, in a disconnected condition.
Figure 9:
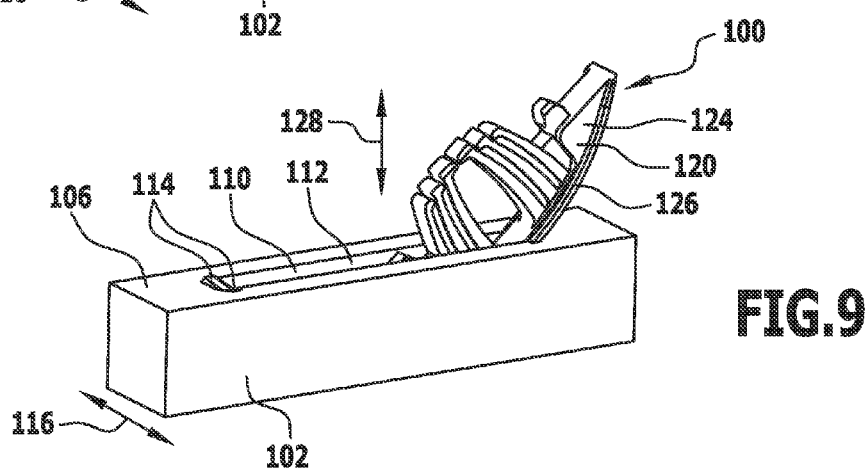
FIG. 9 shows a schematic perspective illustration, corresponding to FIG. 8, of the first connecting element and the first component, in an intermediate condition between the disconnected condition and a mounted condition in which the first connecting element is mounted on the first component.
Figure 10:
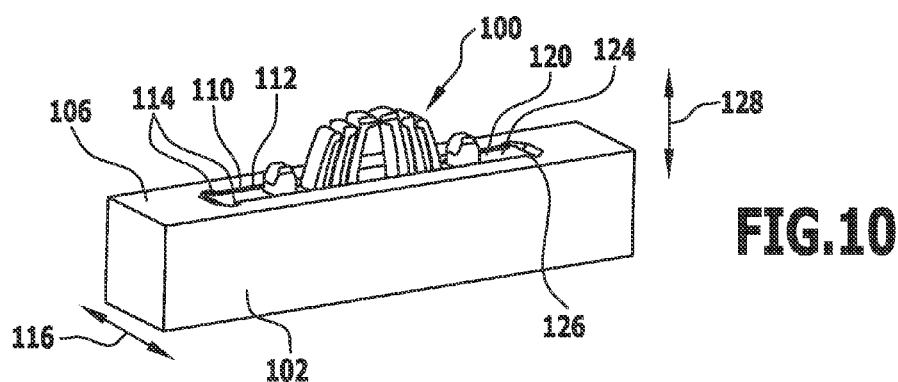
FIG. 10 shows a schematic perspective illustration, corresponding to FIG. 8, of the first connecting element and the first component, wherein the first connecting element is mounted on the first component.
Figure 11:
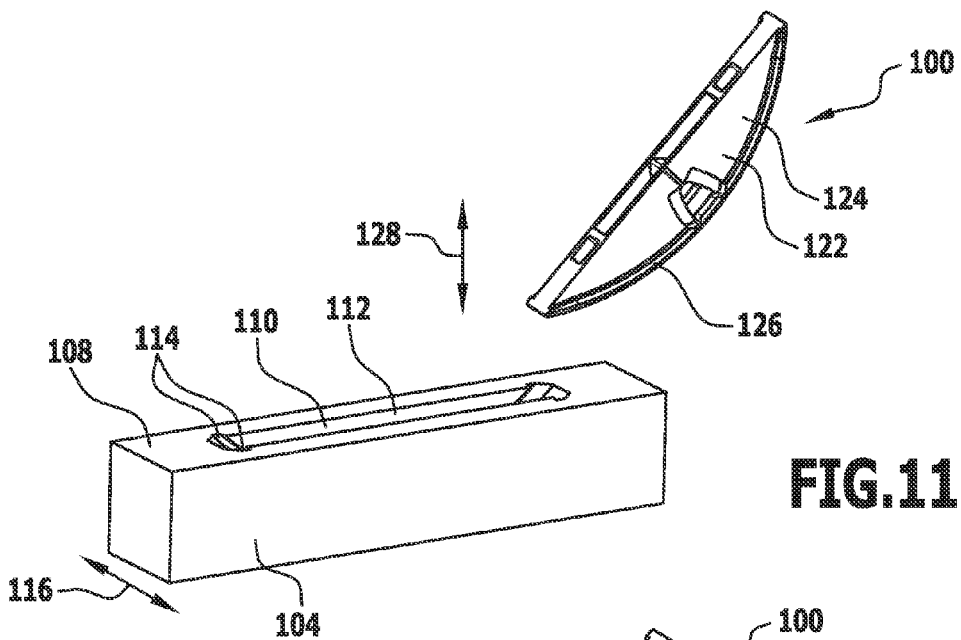
FIG. 11 shows a schematic perspective illustration of the second connecting element and the second component, in a disconnected condition.
Figure 12:
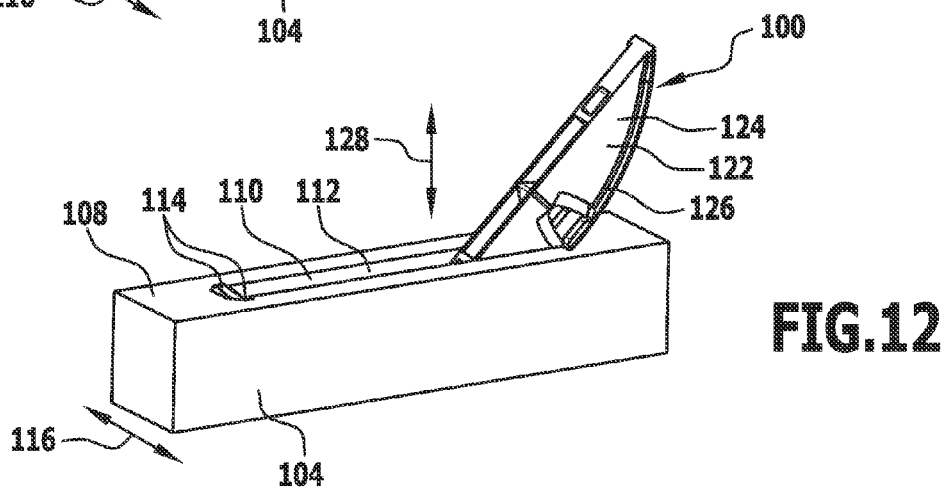
FIG. 12 shows a schematic perspective illustration, corresponding to FIG. 11, of the second connecting element and the second component, in an intermediate condition between the disconnected condition and a mounted condition in which the second connecting element is mounted on the second component.
Figure 13:
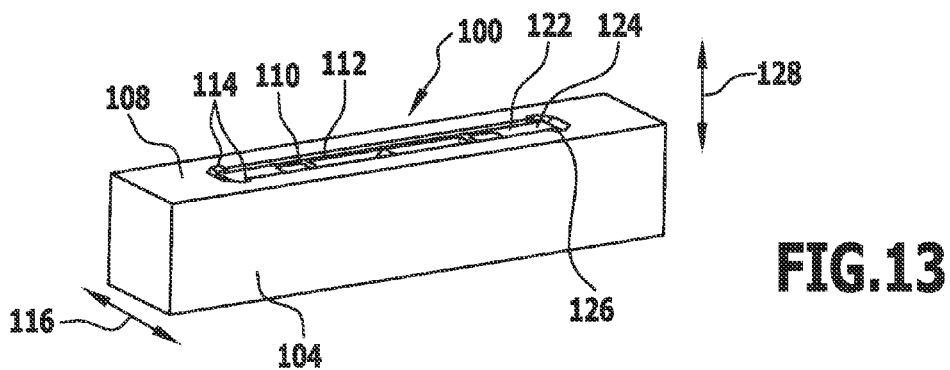
FIG. 13 shows a schematic perspective illustration, corresponding to FIG. 11, of the second connecting element and the second component, wherein the second connecting element is mounted on the second component.

As can be seen in particular from FIGS. 6 and 7, the second connecting element 122 also includes a base body 124, which is shaped at least in certain regions to be at least approximately complementary to the groove 110 in the components 102, 104.

The second connecting element 122 further includes two holding projections 126 which are curved in an arc shape and are constructed to be substantially complementary to the undercut portions 114 of the groove 110.

Thus, the second connecting element 122 may also easily be inserted into a groove 110 and secured therein.

The second connecting element 122 includes a receiving element 168 by means of which the second connecting element 122 is configured to come into engagement with the first connecting element 120, in particular with the spring elements 130 of the first connecting element 120.

The receiving element 168 is arranged, in particular secured, on the base body 124 at an end 170 of the receiving element 168 facing the connecting plane 166 (see in particular FIG. 6).

The receiving element 168 is arranged between two side walls 172 of the base body 124 of the second connecting element 122.

Recesses 174, in particular openings 176, are provided in the side walls 172 such that the receiving element 168 extending between the side walls 172 extends in part along these recesses 174 and thus, in this region, is not connected to the side wall 172 and thus is not connected to the base body 124.

These regions of the receiving element 168 that are not connected to the side wall 172 of the base body 124 of the second connecting element 122 form receiving projections 178 of the receiving element 168.

The receiving projections 178 of the receiving element 168 are in particular constructed to be flexible.

The receiving element 168 is arranged centrally in the connecting element 122 and is constructed in a mirror-symmetrical arrangement in relation to the transverse center plane 146 of the second connecting element 122. In particular, the receiving projections 178 of the receiving element 168 are constructed in a mirror-symmetrical arrangement to one another in relation to the transverse center plane 146 and are arranged to be mirror-symmetrical to one another.

An outer surface 182 of the receiving element 168 preferably has at least approximately a parabolic shape, wherein an x axis extends in the connecting plane 166 and a y axis extends in the transverse center plane 146 (see in particular FIG. 7).

The main spring elements 138, in particular the engaging portions 144 of the main spring elements 138, are moved along this surface 182 of the receiving element 168 when the connecting elements 120, 122 are connected to one another. Because of the parabolic shape of the surface 182, during this there is an initially large and then lesser increase in force during deflection of the main spring elements 138.

The spring elements 130, in particular the main spring elements 138, are tensioned as they move along the surface 182 of the receiving element 168, with the result that the surface 182 of the receiving element 168 forms a clamping portion 184 of the receiving element 168.

The second connecting element 122 further includes two receiving pockets 186 for receiving the insertion projections 164 of the first connecting element 120.

As can be seen in particular from FIG. 3, the engaging portions 144 of the main spring elements 138 and the receiving projections 178 of the receiving element 168 abut against one another in the connected condition, in each case by means of sloping faces 188.

By means of these sloping faces 188, the effect may be achieved on the one hand, in the connected condition of the connecting elements 120, 122, of exerting a pulling force on the connecting elements 120, 122 which draws the connecting elements 120, 122 towards one another. On the other hand, by means of the sloping faces 188, it is possible to ensure that the connecting elements 120, 122 can be moved away from one another without any damage. In particular, because of the sloping faces 188 the main spring elements 138 of the first connecting element 120 can slide along the sloping faces 188 of the receiving element 168, preferably opposite to the connecting direction 128, and as a result of this the engaging portions 144 of the main spring elements 138 can be brought out of engagement with the receiving projections 178 of the receiving element 168.

In further embodiments (not illustrated) of the connecting means 100, it is possible for example to provide a different number of main spring elements 138, auxiliary spring elements 140 and/or stiffening elements 162. Further, in alternative embodiments it is possible to provide for the main spring elements 138 to be constructed and arranged such that the engaging portions 144 of the main spring elements 138 are arranged remote from one another and are configured to move towards one another for the purpose of deflecting the main spring elements 138. The associated second connecting element 122 then preferably includes two mutually spaced receiving elements 168 which, in the connected condition of the connecting elements 120, 122, are arranged on the sides of the main spring elements 138 remote from the transverse center plane 146.

The embodiment of the connecting means 100 that is illustrated in FIGS. 1 to 13 functions as follows.

First the components 102, 104 are provided with the grooves 110 at the locations that oppose one another in the mounted condition of the components 102, 104. In particular, the grooves 110 are milled in the components 102, 104 using a special tool, known for example from EP 1 990 549 A1.

As can be seen in particular from FIGS. 8 to 10 and 11 to 13, the connecting elements 120 and 122 may be inserted into the grooves 110 simply by pushing them in.

Because the holding projections 126 of the connecting elements 120, 122 come into engagement with the undercut portions 114 of the grooves 110 during this pushing-in procedure, the connecting elements 120, 122 are secured with positive engagement in the components 102, 104, at least as regards movement of the connecting elements 120, 122 in the connecting direction 128.

Here, the first connecting element 120 is secured in the first component 102.

This may in particular be relevant if the first component 102 is the component 102, 104 which is to be connected by its short side or end face to a main side of a second component 104.

When the grooves 110 and thus the connecting elements 120, 122 are arranged on the short sides or end faces of in particular plate-like components 102, 104, in particular it is not as a rule critical if parts of the first connecting element 120, in particular the push-in projections 164, the main spring elements 138, the auxiliary spring elements 140 and/or the stiffening elements 162, protrude beyond a surface of the component 102, 104, in particular a contact face 106 at which the components 102, 104 abut against one another.

The second connecting element 122 is preferably arranged in a groove 110 arranged in the main surface of the second component 104, wherein the second connecting element 122 does not protrude beyond the main surface, in particular the contact face 106.

The second component 104 may thus be stacked, by means of the main surface, on further, in particular plate-like components 102, 104 despite the fact that the second connecting element 122 is already mounted, without fear of damage to the components 102, 104 or the second connecting element 122.

To connect the connecting elements 120, 122 and thus the components 102, 104 to one another, the components 102, 104 are moved towards one another, together with the connecting elements 120, 122 arranged therein, in the connecting direction 128, which is preferably perpendicular to the connecting plane 166.

Figure 1:
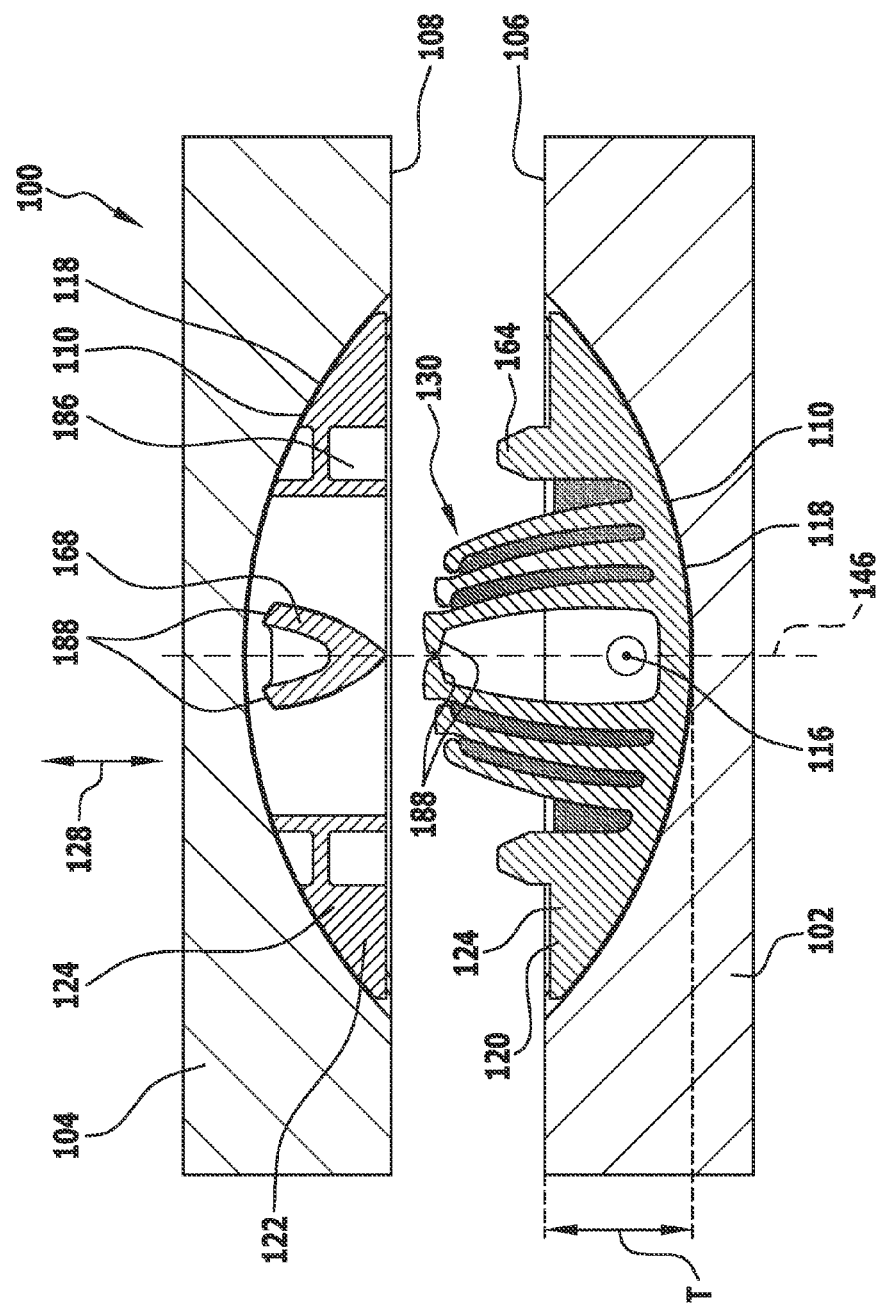
FIG. 1 shows a schematic longitudinal section through two components and two connecting elements of a connecting means for connecting the two components, in a disconnected condition of the components.
Figure 2:
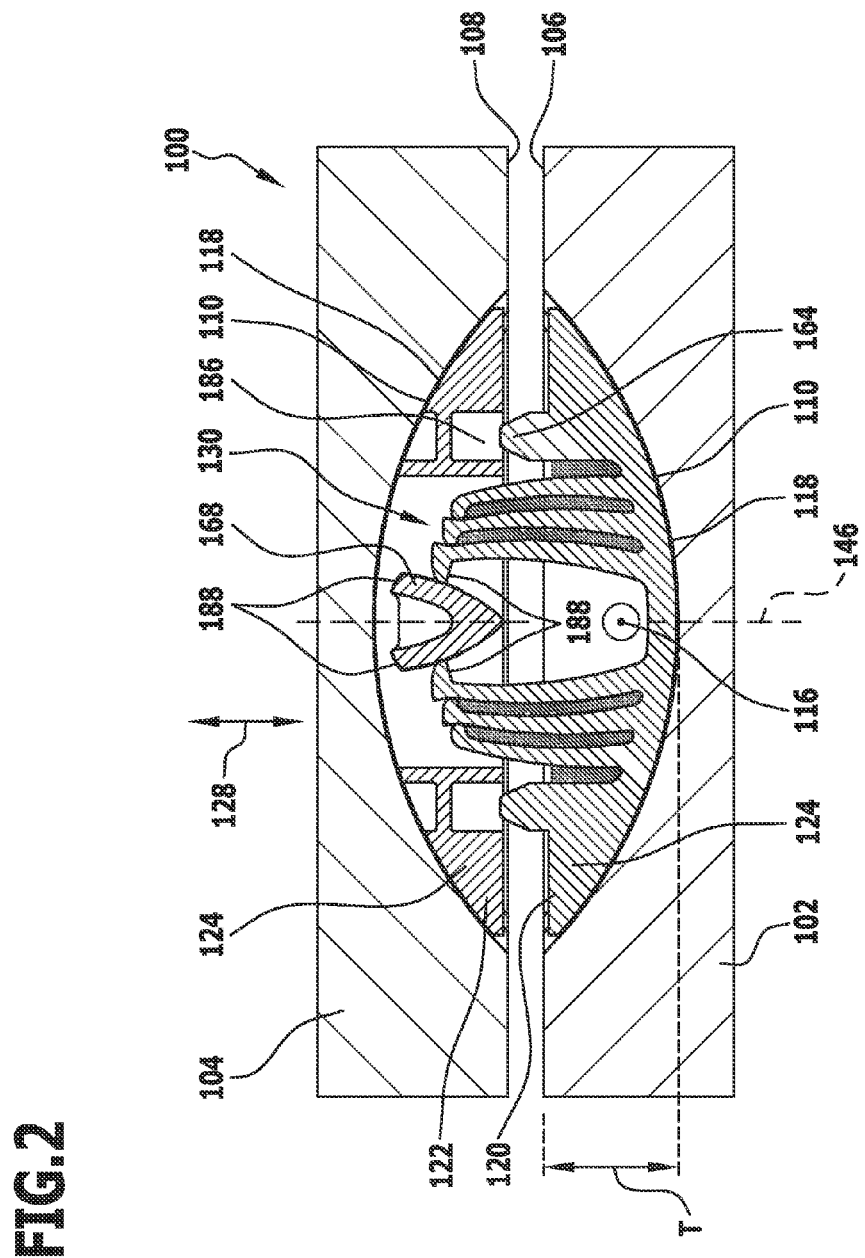
FIG. 2 shows a schematic sectional illustration, corresponding to FIG. 1, of the components and the connecting means, in an intermediate condition between the connected condition and the disconnected condition.

As can be seen in particular from FIGS. 1 to 3, during this the main spring elements 138 first come into engagement with the receiving element 168, in particular with the clamping portion 184 of the receiving element 168.

As they move along the clamping portion 184 of the receiving element 168, the engaging portions 144 of the main spring elements 138 are moved away from the transverse center plane 146 in the deflecting directions 136. During this, the main spring elements 138 are deflected and thus tensioned.

Deflecting the main spring elements 138 also has the effect of deflecting the auxiliary spring elements 140, and moreover the stiffening elements 162 are put under shear load.

Because of the auxiliary spring elements 140 and the stiffening elements 162, the force required to deflect the main spring elements 138 and thus also the spring force of the main spring elements 138 are increased.

Thus, a significantly greater force must be applied to connect the connecting elements 120, 122 to one another than if the main spring elements 138 were provided without the aforementioned reinforcing elements 148.

Because of the parabolic shape of the surface 182 of the receiving element 168, when the first connecting element 120 is pushed onto the second connecting element 122, the main spring elements 138 are initially deflected more quickly and then more slowly.

In particular, this allows a large spring tensioning to be generated in order to connect the connecting elements 120, 122 and thus also the components 102, 104 securely to one another, wherein at the same time a maximum force required for connecting the connecting elements 120, 122 is reduced.

In the embodiment illustrated in the Figures, connecting the connecting elements 120, 122 to one another is moreover optimized in that the receiving projections 178 of the receiving element 168 are constructed to be yielding, in particular flexible. As a result of this, the engaging portions 144 of the main spring elements 138 may be moved past the receiving projections 178 of the receiving element 168 more easily.

An undesirable lateral displacement of the connecting elements 120, 122 in relation to one another, in particular perpendicular to the connecting direction 128, is effectively prevented in the connected condition of the connecting elements 120, 122 by the push-in projections 164 and the associated receiving pockets 186.

Because the connecting means 100 includes spring elements 130 and reinforcing elements 148 for reinforcing the spring force of the spring elements 130, the connecting elements 120, 122 and thus also the components 102, 104 may be connected to one another simply and reliably.

The invention claimed is:

1. A connector for connecting a first component and a second component, the connector comprising:
   a first connecting element which in a connected condition of the components is arrangeable on the first component and includes a spring element, and
   a second connecting element which in the connected condition of the components is arrangeable on the second component and includes a receiving element,
   wherein the receiving element includes at least one of a receiving projection or a receiving recess,
   wherein at least one of the connecting elements has a curved support surface, which is in a shape of a circular arc in longitudinal section,
   wherein, for connecting the first component and the second component, the spring element is configured to come into engagement with the receiving element,
   wherein the connector includes a reinforcing element for reinforcing a spring force of the spring element, wherein the reinforcing element acts directly on the spring element,
   wherein an engaging portion of the spring element engages behind the receiving element in the region of at least one of the receiving projection or the receiving recess, and
   wherein the reinforcing element has smaller dimensions than the spring element.

2. The connector according to claim 1, wherein the reinforcing element is in the form of an auxiliary spring element.

3. The connector according to claim 2, wherein the auxiliary spring element has a shape that at least approximately corresponds to the spring element.

4. The connector according to claim 2, wherein the auxiliary spring element includes an abutment portion by means of which the auxiliary spring element is configured to abut against the spring element.

5. The connector according to claim 2, wherein the auxiliary spring element is formed in at least one of (i) one piece with the spring element; and (ii) one piece with a base body of the first connecting element.

6. The connector according to claim 2, wherein the first connecting element includes the reinforcing element and at least one additional reinforcing element, wherein the reinforcing element and the at least one additional reinforcing element take the form of a first auxiliary spring element and a second auxiliary spring element, respectively, wherein, for reinforcing the spring force of the spring element, the first auxiliary spring element acts directly on the spring element, and wherein, for reinforcing the spring force of the spring element, the second auxiliary spring element acts directly on the first auxiliary spring element which acts directly on the spring element.

7. The connector according to claim 1, wherein the first connecting element includes the reinforcing element, wherein the reinforcing element is in the form of a stiffening element and is connected to the spring element such that a deformation of the spring element results in at least one of a compression and a shearing of the stiffening element.

8. The connector according to claim 7, wherein the stiffening element is made from a material which is a material different from at least one of the material of the spring element and the material of a base body of the first connecting element.

9. The connector according to claim 1, wherein the first connecting element includes the reinforcing element, wherein the reinforcing element is in the form of an auxiliary spring element, and wherein the first connecting element further includes a second reinforcing element that takes the form of a stiffening element, wherein an intermediate space between the auxiliary spring element and the spring element is filled, in part or entirely, by the stiffening element.

10. The connector according to claim 1, wherein the receiving element includes a clamping portion along which an engaging portion of the spring element is movable for making the connection between the first component and the second component, wherein the spring element is thereby tensioned.

11. The connector according to claim 10, wherein the clamping portion has a substantially parabolic cross section.

12. The connector according to claim 1, wherein the receiving element is constructed to be resilient, at least in certain regions.

13. The connector according to claim 1, wherein the receiving element is connected, at an end of the receiving element that faces the first connecting element, to a base body of the second connecting element, and in that at least one end of the receiving element that is remote from the first connecting element is constructed to be movable.

14. The connector according to claim 1, wherein the first connecting element includes at least two spring elements which in the connected condition embrace the receiving element on both sides.

15. The connector according to claim 1, wherein the receiving element is constructed to be symmetrical in relation to a transverse center plane of the receiving element that extends perpendicular to a connecting plane of the connector.

16. The connector according to claim 1, wherein the first connecting element includes at least two spring elements and at least two reinforcing elements, wherein, in relation to a transverse center plane of the first connecting element that extends perpendicular to a connecting plane of the connector, the at least two spring elements and the at least two reinforcing elements are at least one of (i) arranged symmetrically to one another on the first connecting element; and (ii) constructed to be symmetrical to one another.

17. The connector according to claim 1, wherein at least one connecting element includes a base body which is substantially in the shape of a circular-cylindrical segment or a circular-cylindrical portion, and at least one holding projection which is substantially in the shape of a circular arc and by means of which the at least one connecting element is securable in the component.

18. The connector according to claim 1, wherein the engaging portion of the spring element has a sloping face which is configured to come into contact with a sloping face of the receiving element such that in the connected condition the connecting elements are drawn towards one another by means of a connecting force.

\* \* \* \* \*